D. WATSON.
Mole Plow.
No. 22,522.
Patented Jan. 4, 1859.
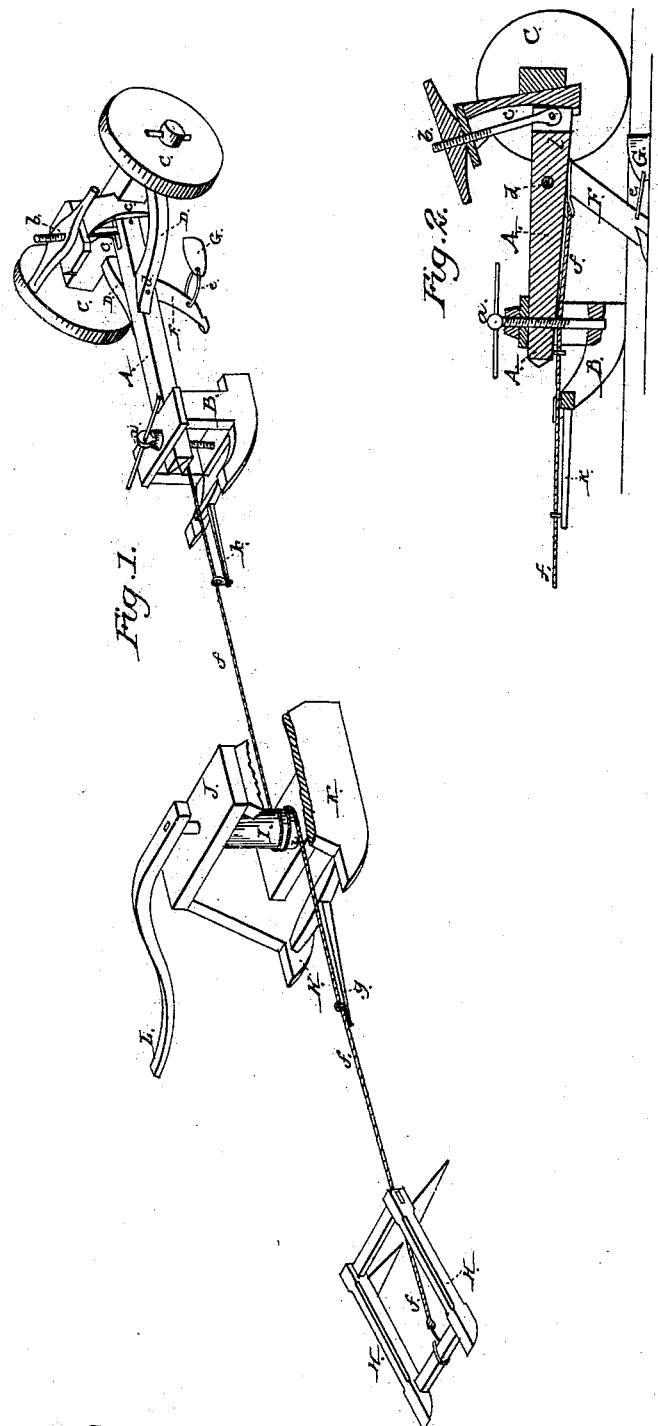

UNITED STATES PATENT OFFICE.

DANIEL WATSON, OF NEWPORT, OHIO.

IMPROVED MODE OF OPERATING DRAIN-PLOWS.

Specification forming part of Letters Patent No. 22,522, dated January 4, 1859.

*To all whom it may concern:*

Be it known that I, DANIEL WATSON, of Newport, in the county of Madison and State of Ohio, have invented certain new and useful Improvements in Constructing and Operating Underground Ditching-Plows; and I do hereby declare the following to be a full, clear, and exact description of the same, reference being had to the accompanying drawings, making a part of this specification, in which—

Figure 1 represents a perspective view of the entire apparatus. Fig. 2 represents a longitudinal vertical section through the plow.

Similar letters of reference, where they occur in the separate figures, denote like parts of the apparatus in both of the figures.

My invention relates to the means of operating an underground drain-plow, as will be explained.

The beam A is secured to the front truck, B, by a screw-lever, *a*, so that the point of said beam may be raised or lowered on said truck or drag B. The rear truck, C, which is on wheels, supports the rear end of the beam by a screw-lever, *b*, so as to raise or lower its heel, which can move between guides *c c*, properly affixed to said rear truck.

The hounds D D are permanently fixed to the axle E; but where they joint the beam A, which may be considered as the reach in this point of view—viz., at *d*—they are pivoted, so that the rear of the beam may be raised or lowered independent of the rear truck.

F is a colter strongly secured to the beam, and long enough to extend to the bottom of the ditch or drain that is to be made. To this colter F is fastened by a link, *e*, the mole G, which forms the underground drain by being drawn behind the colter.

H is a crab or anchor, which is carried ahead in the line of the drain to be formed and permanently secured to the ground in said line. From this crab extends a rope or chain, *f*, back through a ring in the point of the tongue *g* to guide it, and thence to the drum I of what may be termed a "traveling capstan," J, and the rope or chain is fastened to said drum, as at *i*, and thence continues to pass backward through a ring in the point of the tongue *k*, to guide it and the plow, and is eventually fastened to the beam A or to the colter F, which take the main strain upon the plow.

The traveling capstan is furnished with runners K upon which it can move, and with a sweep, L, by which it can be operated by horse or animal power.

It will be perceived that by using the traveling capstan instead of a stationary one the movement of the plow is expedited to double the forward motion that the stationary one would give it, inasmuch as the capstan is drawing itself toward the crab at the same time and by the same drum that it is drawing the plow toward itself; and by this means I get the necessary application of power and yet the speed also which is necessary to make the operation economical.

When the machine is in motion the mole G can be raised or lowered to give the ditch such depth as may be desired below the surface of the ground.

Having thus fully described the nature and operation of my ditching-plow, what I claim therein as new, and desire to secure by Letters Patent, is—

Combining with the crab or anchor H and the plow a traveling capstan, J, which are connected together by a rope or chain, as herein represented, for the purpose of working said plow, as described.

DANIEL WATSON.

Witnesses:
 A. B. STOUGHTON,
 THOS. H. UPPERMAN.